United States Patent [19]

Kobayashi et al.

[11] Patent Number: 4,803,138

[45] Date of Patent: Feb. 7, 1989

[54] NONAQUEOUS SECONDARY BATTERY

[75] Inventors: Yukio Kobayashi, Sagamihara; Masataka Takeuchi, Yamato; Mutsumi Kameyama, Hatogaya; Manabu Ohira; Yoshikazu Kikuta, both of Kawasaki; Toyohiko Takahashi, Yokohama, all of Japan

[73] Assignee: Showa Denko K.K. & Hitachi, Ltd., Tokyo, Japan

[21] Appl. No.: 168,046

[22] Filed: Mar. 14, 1988

[51] Int. Cl.⁴ .................... H01M 4/60; H01M 6/14
[52] U.S. Cl. ................................. 429/194; 429/213
[58] Field of Search ............ 429/194, 197, 196, 199, 429/213, 212

[56] References Cited

U.S. PATENT DOCUMENTS

| | | | |
|---|---|---|---|
| 4,321,114 | 3/1982 | MacDiarmid et al. | 429/213 X |
| 4,537,843 | 8/1985 | Shishikura et al. | 429/197 |
| 4,547,439 | 10/1985 | Genies | 429/213 X |
| 4,629,540 | 12/1986 | Geniees et al. | 429/212 X |
| 4,717,634 | 1/1988 | Daifuku et al. | 429/213 |
| 4,740,436 | 4/1988 | Kobayashi et al. | 429/194 |

*Primary Examiner*—Anthony Skapars
*Attorney, Agent, or Firm*—Sughrue, Mion, Zinn, Macpeak & Seas

[57] ABSTRACT

A nonaqueous secondary battery is disclosed. The positive electrode is composed of a polymer obtained by oxidative polymerization of an aniline compound of the formula:

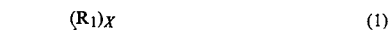

and

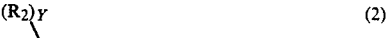

wherein $R_1$ and $R_2$ are C1-5 alkyl or C1-5 alkoxy, and X and Y are 0, 1 or 2, or a reduction product of the polymer the negative electrode is composed of (i) an alkali metal, (ii) an alkali metal alloy, (iii) an electroconductive polymer or (iv) composite of an electroconductive polymer with an alkali metal or an alkali metal alloy. The electrolytic solution is composed of a supporting electrolyte selected from $LiAsF_6$, $LiBF_4$ and $LiPF_6$ and a solvent, wherein when the supporting electrolyte is $LiAsF_6$ or $LiPF_6$, the solvent is a mixed solvent comprising at least one member selected from propylene carbonate and ethylene carbonate and at least one member selected from tetrahydrofuran and 1,2-dimethoxyethane, and when the supporting electrolyte is $LiBF_4$, the solvent is a mixed solvent comprising propylene carbonate, ethylene carbonate and at least one member selected from tetrahydrofuran and 1,2-dimethoxyethane.

15 Claims, 1 Drawing Sheet

NONAQUEOUS SECONDARY BATTERY

BACKGROUND OF THE INVENTION

1. Field of the Invention

The present invention relates to a nonaqueous secondary battery having a high energy density, a small self-discharge ratio, a long cycle life and a good charge-discharge efficiency (Coulomb efficiency).

2. Description of the Related Art

A polymer battery comprising an electrode composed of a polymeric compound having a conjugated double bond in the main chain is known as a secondary battery having a high energy density. Various reports concerning secondary batteries have been published, for example, by P. J. Nigrey et al, J. Chem. Soc. Chem. Commun., 1979, 594; J. Electrochem. Soc., 1981, 1651; and Japanese Unexamined Patent Publications No. 56-136,469, No. 57-121,168, No. 59-3,870, No. 59-3,872, No. 59-3,873, No. 59-196,566, No. 196,573, No. 59-203,368, and No. 59-203,369.

The use of polyaniline obtained by electrolytic oxidative polymerization of aniline as an electrode of an aqueous solution type or nonaqueous solvent type battery has already been proposed [A. G. MacDiarmid et al, Polymer Preprints, 25, No. 2, 248 (1984), Sasaki et al, Lectures at 50th General Meeting of Electrochemical Association, 123 (1983) and Sasaki et al, Lectures at 51st General Meeting of Electrochemical Association, 228, (1984)].

However, none of the known polymer batteries comprising a polymer can simultaneously satisfy all of the requirements of (i) a high energy density, (ii) a low self-discharge ratio, (iii) a high charge-discharge efficiency, and (iv) a long cycle life.

SUMMARY OF THE INVENTION

Therefore, a primary object of the present invention is to provide a nonaqueous secondary battery capable of simultaneously satisfying the above-mentioned requirements (i), (ii), (iii) and (iv) for the electrode performance.

More specifically, in accordance with the present invention, there is provided a nonaqueous secondary battery which comprises a positive electrode composed of a polymer obtained by oxidative polymerization of at least one aniline compound selected from compounds represented by the following formulae (1) and (2).

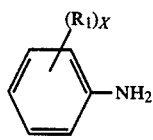

and

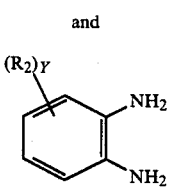

wherein $R_1$ and $R_2$ stand for an alkyl group having 1 to 5 carbon atoms or an alkoxy group having 1 to 5 carbon atoms, and X and Y are 0, 1 or 2,
or a reduction product of the polymer, a negative electrode composed of (i) an alkali metal, (ii) an alkali metal alloy, (iii) an electroconductive polymer or (iv) a composite of an electroconductive polymer with an alkali metal or alkali metal alloy, and an electrolytic solution comprising a supporting electrolyte selected from $LiAsF_6$, $LiBF_4$ and $LiPF_6$, and a solvent, wherein when the supporting electrolyte is $LiAsF_6$ or $LiPF_6$, the solvent is a mixed solvent comprising at least one member selected from propylene carbonate and ethylene carbonate and at least one member selected from tetrahydrofuran and 1,2-dimethoxyethane, and when the supporting electrolyte is $LiBF_4$, the solvent is a mixed solvent comprising (a) propylene carbonate, (b) ethylene carbonate, and (c) at least one member selected from tetrahydrofuran and 1,2-dimethoxyethane.

DESCRIPTION OF THE PREFERRED EMBODIMENTS

Figure 1:
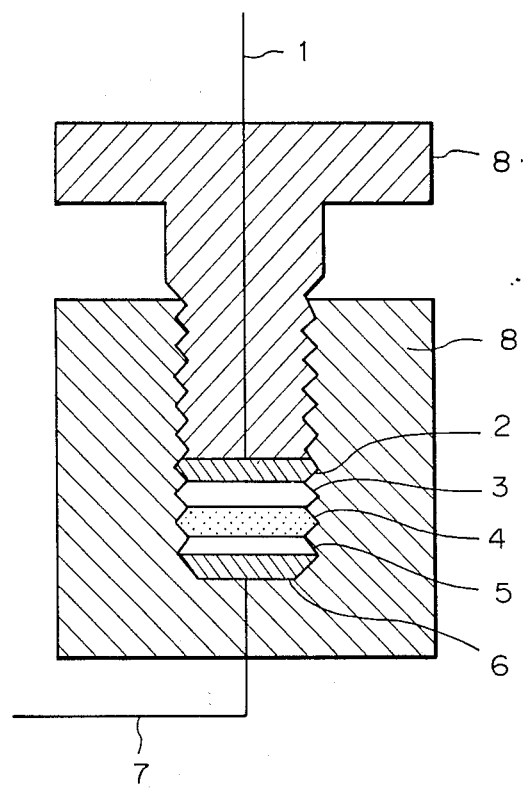
FIG. 1 is a schematic diagram illustrating a cross-section of a battery cell for measuring the characteristics of a secondary battery according to one embodiment of the present invention.

The present invention will now be described in detail.

The polymer used for the positive electrode of the secondary battery of the present invention is obtained by oxidative polymerization of at least one aniline compound selected from compounds represented by the following formulae (1) and (2):

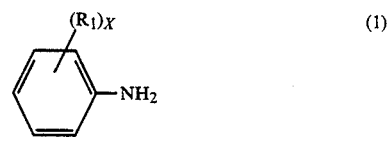

and

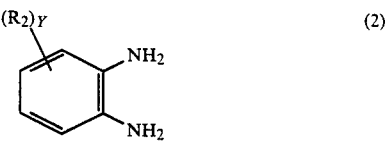

wherein $R_1$ and $R_2$ stand for an alkyl group having 1 to 5 carbon atoms or an alkoxy group having 1 to 5 carbon atoms, and X and Y are 0, 1 or 2.

As the aniline compound represented by the general formula (1) or (2), there can be mentioned, for example, aniline, 2-methylaniline, 2,5-dimethylaniline, 2-methoxyaniline, 2,5-dimethoxyaniline, o-phenylenediamine and 3-methyl-1,2-diaminobenzene. Among these compounds, aniline and o-phenylenediamine are preferred, and aniline is especially preferred.

The aniline compound can be polymerized by either electrochemical polymerization or chemical polymerization.

In the case of the electrochemical polymerization process, polymerization of the aniline compound is performed by anodic oxidation and, for example, a current density of 0.1 to 20 mA/cm² is used and a voltage of 1 to 300 volts is applied in many cases. Polymerization is preferably carried out in the presence of a liquid capable of dissolving the aniline compound therein, and water or a polar organic solvent is used as the liquid. When a solvent miscible with water is used, a small amount of water may be added. As preferred organic solvents, there can be mentioned alcohols, ethers such as dioxane and tetrahydrofuran, acetone, acetonitrile, benzonitrile, dimethylformamide, and N-methylpyrrolidone.

Polymerization is carried out in the presence of a supporting electrolyte. By the supporting electrolyte is meant a salt containing as the anion $BF_4^-$, $AsF_4^-$, $AsF_6^-$, $SbF_6^-$, $SbCl_6^-$, $PF_6^-$, $ClO_4^-$, $HSO_4^-$, $SO_4^{2-}$ or a group

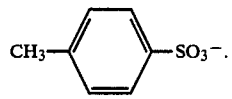

The salt contains as the cation a proton ($H^+$), a quaternary ammonium ion, a lithium ion, a sodium ion or a potassium ion. The supporting electrolyte is ordinarily used in an amount such that the polymer contains 10 to 100 mole% of the anion.

Where the polymer is prepared according to the chemical process, for example, the aniline compound can be polymerized in an aqueous solution by using a strong acid such as hydrochloric acid and an inorganic peroxide such as potassium persulfate. According to this process, the polymer is obtained in the form of a fine powder. Since the salt is present in the chemical process, the polymer is recovered in the form of a complex with the corresponding anion.

The inorganic peroxide used for chemically preparing the oxidation polymer of the aniline compound is not particularly critical, so far as it is soluble in an aqueous solution of a strong acid. For example, there can be mentioned ammonium persulfate, potassium persulfate, hydrogen peroxide, and ammonium persulfate/Fe (II) ion redox system, a hydrogen peroxide/Fe (II) ion redox system, potassium dichromate, potassium permanganate and sodium chromate. In order to obtain a secondary battery having a good battery performance, preferably ammonium persulfate, an ammonium persulfate/Fe (II) ion redox system, and a hydrogen peroxide/iron (II) ion redox system are used as the inorganic peroxide.

The complex polymer obtained by polymerization is preferably pre-treated with a base to effect dedoping. As the base, inorganic bases such as aqueous ammonia, sodium carbonate, potassium hydroxide, and sodium hydroxide, and organic bases, for example, lower aliphatic amines such as triethylamine, can be used, and among these bases, aqueous ammonia is preferred.

As another dedoping or deporotonating means, there can be mentioned a process in which a heat treatment is carried out at 100° to 300° C., and an electrochemical process. Preferably, a low-molecular-weight fraction is removed by washing or extraction with an organic solvent before or after the alkali treatment. However, even if this treatment is not carried out, no disadvantage occurs. The dedoped or deprotonated polyaniline compound, for example, dedoped or deprotonated polyaniline, has a number of emelardine structures represented by the following formula (3):

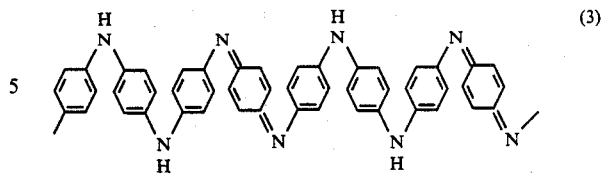

Preferably, the dedoped or deprotonated polyaniline compound is reduced. The reduction process is not particularly critical, and a process is generally adopted in which the oxidation polymer of the aniline compound is immersed in a solution of a reducing agent while the solution is stirred or subjected to ultrasonic vibration. The solution of the reduced agent may be either homogeneous or heterogeneous.

As the reducing agent, there can be mentioned hydrazines such as hydrazine, hydrous hydrazine and phenylhydrazine, metal hydrides such as ammonium lithium hydride and sodium boron hydride, and mercaptans. Hydrazines, especially hydrazine, hydrous hydrazine and phenylhydrazine, are preferred. The reducing agent is generally used in the form of a solution in a solvent. As the solvent, there can be used water, ethers such as diethyl ether, and alcohols such as methyl alcohol and ethyl alcohol.

The amount of the reducing agent used is not particularly critical, but the reducing agent is generally used in an amount larger than the amount giving one hydrogen atom per nitrogen atom contained in the oxidation polymer of the aniline compound. Preferably, the reducing agent is used in an amount that will give 1.5 to 3 hydrogen atoms per nitrogen atom contained in the oxidation polymer. The time required for the reduction reaction is scores of minutes to several hours and is not particularly critical. The reduction reaction is advanced promptly even at room temperature, but the reduction reaction may be carried out under heating. After reduction reaction, the reduced oxidation polymer of the aniline compound is washed with the same solvent as used for the solution of the reducing agent to remove the reducing agent and then the polymer is dried. Since the reduced oxidation polymer of the aniline compound is ordinarily in the easily oxidizable state, the series of operations of the reduction treatment is preferably carried out in an inert gas atmosphere.

The reduced polymer, for example, reduced polyaniline, has a number of luecoemeraldine structures represented by the following formula (4):

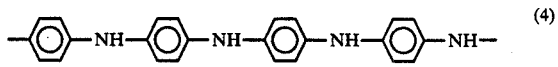

The reduced polymer used in the present invention contains the substance represented by the general formula (4) in an amount of at least 50 mole%, preferably at least 65 mole%, especially preferably at least 75 mole%.

Preferably, the dedoped or deprotonated polymer is used after again being complexed with a proton acid.

A product can be used which is obtained by oxidizing the emelardine structure represented by the formula (3) with an oxidant to convert this structure to a nigraniline structure of the formula (5) or a pernigraniline structure of the formula (6) and complexing the structure with a proton acid:

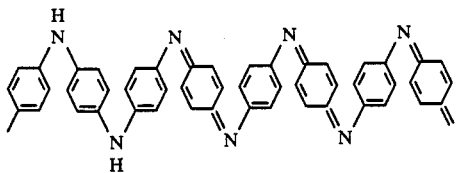

and

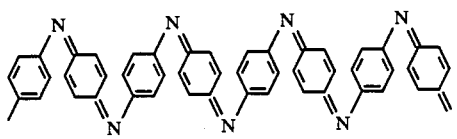

The complexing process is not particularly critical, but ordinarily, a process in which the polymer is placed in contact with an acidic aqueous solution containing an anion and having a pH value smaller than 3 is adopted.

As the complexing agent, there can be mentioned hydrogen halides such as HCl, HF and HBr, proton acids of halides of elements of the group IIIa, such as $HBF_4$, proton acids of halides of elements of the group Va such as $HPF_6$, perchloric acids such as $HClO_4$, and $H_2SO_4$ and $HNO_3$. Any proton acid capable of complexing the polymer can be used without limitation. Of these proton acids, $HBF_4$, $HPF_6$ and $HClO_4$ are preferred, and $HBF_4$ and $HPF_6$ are especially preferred. The anion of the protonic acid may be different from the anion of the electrolytic solution of the secondary battery of the present invention, but preferably the anion of the proton acid is the same as the anion of the electrolytic solution.

The above-mentioned alkali treatment, organic solvent washing, reduction treatment, oxidation and complexing treatment with a proton acid may be carried out before or after formation of the polymer into an electrode.

The molded article that can be used as the electrode can be obtained according to various methods. In the case of the anodic oxidation of the aniline compound, the polymer is complexed with an anion, and the polymer in the form of an electrode to be used is obtained. If the positive electrode has a flat shape, a flat layer of the polymer is formed. When the process for preparing a fine powder of the polymer is utilized, the fine powder can be compression-molded into a molded article under pressure and heated according to known procedures. In many cases, temperature ranging from room temperature to 300° C. and pressures ranging from 10 to 10,000 kg/cm² are adopted. According to this known process for preparing the anionic complexed polymer, a molded article having an optional shape can be obtained. Namely, a molded article in the form of a film or plate or having a three-dimensional shape is used.

The negative electrode used for the secondary battery of the present invention is composed of (i) an alkali metal, (ii) an alkali metal alloy, (iii) an electroconductive polymer or (iv) an alkali metal or alkali metal alloy/electroconductive polymer composite.

As the alkali metal (i), there can be mentioned Li, Na and K, and as the alkali metal alloy (ii), there can be mentioned an Li/Al alloy, an Li/Hg alloy, an Li/Zn alloy, an Li/Cd alloy, an Li/Sn alloy and an Li/Pb alloy, and alloys of at least 3 metals including the alkali metal used for the foregoing alloys, such as an Li/Al/Mg alloy, an Li/Al/Sn alloy, an Li/Al/Pb alloy, an Li/Al/Zn alloy, an Li/Al/Hg alloy, an Li/Pb/La alloy and an Li/Pb/In alloy.

These alloys can be prepared according to either the electrochemical process or the chemical process.

As the electroconductive polymer (iii), there can be mentioned polypyrrole, polypyrrole derivatives, polythiophene, polythiophene derivatives, polyquinoline, polyacene, poly-p-phenylene, poly-p-phenylene derivatives and polyacetylene. As the alkali metal or alkali metal alloy/electroconductive polymer composite (iv), there can be mentioned a composite of the above-mentioned alkali alloy with the above-mentioned electroconductive polymer, for example, poly-p-phenylene or polyacetylene.

Of these negative electrode-forming substance, polyacetylene, poly-p-phenylene, Li metal, an Li/Al alloy, an Li/Al/Mg alloy, an Li/Pb alloy, an Li/Pb/La alloy, an Li/Pb/In alloy, and a composite of an Li/Al alloy with polyacene or poly-p-phenylene are preferred. By the composite referred to herein is meant a homogeneous mixture of an alkali metal or alkali metal alloy and an electroconductive polymer, a laminate of an alkali metal or alkali metal alloy and an electroconductive polymer, and a modification product obtained by modifying one component as the base with the other component.

As is well-known to those skilled in the art, other appropriate electroconductive materials, such as carbon black, acetylene black, metal powders, metal fibers, and carbon fibers, may be incorporated in the aniline compound polymer, electroconductive polymer, and interlaminar compound used for the electrode of the secondary battery of the present invention.

Furthermore, the electrode of the secondary battery of the present invention may be reinforced with a thermoplastic resin such as polyethylene, modified polyethylene, polypropylene, polytetrafluoroethylene, an ethylene/propylene/diene terpolymer (EPDM) or sulfonated EPDM.

The electrolytic solution used for the secondary battery of the present invention contains as the supporting electrolyte at least one member selected from $LiPF_6$, $LiAsF_6$ and $LiBF_4$, and (i) when the supporting electrolyte is $LiAsF_6$ or $LiPF_6$, a mixed solvent comprising at least one member selected from propylene carbonate and ethylene carbonate and at least one member selected from tetrahydrofuran and 1,2-dimethoxyethane is used as the solvent or (ii) when the supporting electrolyte is $LiBF_4$, a mixed solvent comprising propylene carbonate, ethylene carbonate and at least one member selected from tetrahydrofuran and 1,2-dimethoxyethane is used as the solvent.

The amount of the electrolyte solution and the concentration of the supporting electrolyte are selected so that the concentration of the supporting electrolyte at the time of termination of the discharging is at least 2 mole/l, preferably at least 3 mole/l, and the concentration of the supporting electrolyte at the time of termination of the charging is not higher than 2.0 mole/l, preferably not higher than 1.5 mole/l. The upper limit of the concentration of the supporting electrolyte at the time of termination of the discharging is not particularly critical, but preferably the concentration is lower than the saturation concentration. Note, the unit mole/l of the concentration referred to herein is mole/l-solvent.

Preferably, the mixing proportions of the respective solvents in the mixed solvent are selected so that the content of each solvent in the mixed solvent is at least 10% by volume, especially at least 20% by volume.

By using the supporting electrolyte and mixed solvent in amounts included within the above-mentioned ranges, the amount of the electrolytic solution can be extremely reduced and the energy density of the battery can be remarkably increased, and therefore, the present invention is very valuable from the industrial viewpoint.

The amount of the dopant to be doped in the polymer in the nonaqueous secondary battery of the present invention is 0.2 to 1.5 moles, preferably 0.3 to 0.8 mole, per nitrogen atom contained in the oxidation polymer.

The doping quantity can be freely controlled while measuring the quantity of electricity flowing at the electrolysis. Doping can be carried out under a constant current, under a constant voltage or under conditions where both the current and the voltage are changed.

Preferably, the nonaqueous secondary battery of the present invention be driven within a voltage range between 4.5 and 1.5 V, especially 4.3 and 1.7 V, particularly especially 4.1 and 1.9 V. If the driving voltage is within the above-mentioned range, any of the constant current method, constant voltage method, current pulse method and voltage pulse method can be adoped as the charging method.

If the voltage range exceeds 4.5 V or is below 1.5 V, decomposition of the electrolytic solution and/or reaction between the electrolytic solution and electrode active substance occurs and the battery performance is adversely affected.

In the present invention, a porous membrane composed of a synthetic resin such as polyethylene or polypropylene or a separator composed of a natural fiber paper may be used according to needs.

Some of the electrodes used for the secondary battery of the present invention react with oxygen or water to reduce the battery performance. Accordingly, preferably the battery is closed to maintain a substantially oxygen-free and anhydrous state.

The secondary battery of the present invention has a high energy density, a high charge-discharge efficiency, a long cycle life, a small self-discharge ratio, and a good voltage level at the time of discharge. Furthermore, since the secondary battery of the present invention has a light weight, a small size, and a high energy density, the battery of the present invention is advantageously used for portable instruments, electric cars, and gasoline cars, and as a power storage battery.

The present invention will now be described in detail with reference to the following examples and comparative examples.

EXAMPLE 1

(Preparation of Polyaniline Electrode)

A three-neck flask having a capacity of 1 liter was charged with 400 ml of distilled water, from which oxygen had been removed in advance, and 100 ml of an aqueous solution containing 42% by weight of $HBF_4$, and nitrogen gas was bubbled in the mixture with stirring for about 1 hour. The inner atmosphere was replaced with nitrogen, a thermometer and a condenser were attached to the flask, and the flask was cooled with water and ice so that the solution temperature was 15° C. Then, 20 g of aniline was added to the solution, and after the monomer was dissolved, 22 g of ammonium persulfate was added at one time. A reaction was carried out for 5 hours with stirring while maintaining the inner temperature below 25° C. After termination of the reaction, a greenish brown reaction liquid was filtered, and the recovered solid was vacuum-dried to obtain 15 g of a dense-green product.

To 1 g of this product was added 100 ml of acetone, and the mixture was stirred at room temperature for 3 hours. The slurry was filtered and the solid was recovered. Then, 100 ml of acetone was added to the solid and the mixture was treated in the same manner as described above. When this operation was repeated 3 times, the filtrate became substantially colorless. The obtained polyaniline was treated with aqueous ammonia to obtain a polyaniline powder having the emelardine structure represented by the above-mentioned formula (3). To this polyaniline powder were added 10% by weight of polytetrafluoroethylene and 10% by weight of carbon black, and the mixture was compression-molded at room temperature under a pressure of 500 $kg/cm^2$ to form an electrode.

(Preparation of Filmy Acetylene High Polymer)

In a glass reaction vessel having an inner capacity of 500 ml, 1.7 ml of titanium tetrabutoxide was dissolved in 30 ml of anisole in a nitrogen atmosphere, and 2.7 ml of triethylaluminum was added to the solution with stirring to prepare a catalyst solution.

The reaction solution was cooled by liquefied nitrogen and the nitrogen gas in the system was removed by a vacuum pump. Then, the reaction solution was cooled to −78° C. and refined acetylene gas kept under a pressure of one atmosphere was blown in the catalyst solution while kept stationary.

Immediately, polymerization took place on the surface of the catalyst solution to form a filmy acetylene high polymer. When 30 minutes had passed after introduction of acetylene, acetylene gas in the reaction vessel was removed to stop the polymerization. In a nitrogen atmosphere, the catalyst solution was removed by a syringe, and the product was repeatedly washed with 100 ml of toluene 5 times while maintaining the temperature at −78° C. The filmy acetylene high polymer swollen with toluene was a homogeneous swollen filmy product in which fibrils were densely entangled with one another. Then, the swollen product was vacuum-dried to obtain a filmy acetylene high polymer having a metallic luster and a reddish violet color and having a thickness of 180 μm and a cis content of 98%. The bulk density of this filmy acetylene high polymer was 0.30 g/cc, and the electroconductivity (direct current four-terminal method) was $3.2 \times 10^{-9} \cdot \Omega^{-1} \cdot cm^{-1}$ at 20° C.

(Battery Performance Test)

A battery cell for the measurement of characteristics, shown in FIG. 1, was constructed by using the polyaniline electrode (disk having an diameter of 20 mm) obtained according to the above-mentioned method and a disk having a diameter of 20 mm, which was punched out from the above-mentioned filmy acetylene high polymer, as active substances of positive and negative electrodes, respectively. More specifically, a platinum net collector 6 for a positive electrode, which had a diameter of 20 mm and a mesh size of 80 mesh, was placed in a lower part of a concave portion of a screw vessel 8 composed of polytetrafluoroethylene, and a disk-shaped positive electrode 5 having a diameter of 20 mm was placed on the platinum net collector 6, and a porous polypropylene circular separator 4 having a diameter of 20 mm was placed on the positive electrode 5. The assembly was impregnated with an electrolytic solution, and a disk-shaped negative electrode 3 having a diameter of 20 mm was piled on the assembly and a platinum net collector 2 for a negative electrode, having a diameter of 20 mm and a mesh size of 80 mesh, was placed on the negative electrode 3. The vessel was clamped to construct a battery. Reference numeral 1 reprepresents a platinum lead line for a negative electrode and reference numeral 7 represents a lead line for a positive electrode.

As the electrolytic solution was used 0.7 cc of a solution of 4 mole/l of $LiPF_6$ in a mixed solvent of propylene carbonate (PC) and 1,2-dimethoxyethane (DME) (volume ratio=1/1), which was distilled and dehydrated according to customary procedures.

The so-constructed battery was charged under a constant current density of 2.5 mA/cm$^2$ in an argon atmosphere while applying electricity in a quantity such that the doping amounts to the positive and negative electrodes were 45 mole% and 6 mole%, respectively. At the time of termination of the charging, the concentration of $LiPF_6$ in the electrolytic solution was 0.7 mole/l. Just after termination of the charging, discharging was conducted under a constant current density of 2.5 mA/cm$^2$, and when the battery voltage became 1.0 V, charging was carried out under the above-mentioned conditions. Thus, the charge-discharge repetition test was carried out. The repetition frequency (cycle life) of charging-discharging conducted until the charge-discharge efficiency was reduced to 50% was 648.

At the 5th cycle, the energy density was 110 W.hr/kg based on the weight of the electrode active substances and electrolytic solution. The maximum charge-discharge efficiency was 100%. When the battery was allowed to stand in the charged state for 75 hours, the self-discharge ratio was 1.9%.

EXAMPLE 2

The polyaniline powder of the emelardine structure obtained in Example 1 was immersed in an aqueous solution of hydrazine to effect reduction and form leucoemelardine having a structure shown by the formula (4). To this leucoemelardine were added 10% by weight of polytetrafluoroethylene and 10% by weight of carbon black, and the mixture was compression-molded at room temperature under a pressure of 500 kg/cm$^2$ to form an electrode.

The battery performance test was carried out in the same manner as described in Example 1 except that the so-formed electrode was used as the positive electrode, an Li/Al alloy (94/6 weight ratio) was used as the negative electrode, and 0.6 ml of a solution of 4.5 mole/l of $LiPF_6$ in (PC+DME) (PC/DME volume ratio=60/40) was used as the electrolytic solution.

EXAMPLE 3

The polyaniline powder of the emelardine structure obtained in Example 1 was immersed in an aqueous solution of $HBF_4$ having a pH value of 1 to complex the polyaniline with $HBF_4$ (protonation). The battery performance test was carried out in the same manner as described in Example 2 except that the so-obtained complexed polyaniline was used for the positive electrode.

EXAMPLE 4

The battery performance test was carried out in the same manner as described in Example 1 except that composite of the acetylene high polymer and Al (weight ratio=1/1) was used as the negative electrode for construction of the battery.

EXAMPLE 5

The battery performance test was carried out in the same manner as described in Example 1 except that the battery was constructed by using 0.7 ml of a solution of 3 mole/l of $LiAsF_6$ in a mixed solvent of PC and ethylene carbonate (EC) (volume ratio=1/1) as the electrolytic solution for construction of the battery and the current density at the time of charging and discharging was changed to 1.0 mA/cm$^2$.

COMPARATIVE EXAMPLE 1

The battery performance test was carried out in the same manner as described in Example 1 except that the battery was constructed by using a solution of 3 mole/l of $LiAsF_6$ in PC as the electrolytic solution.

COMPARATIVE EXAMPLE 2

The battery performance test was carried out in the same manner as described in Example 5 except that the battery was constructed by using a solution of 3 mole/l of $LiAsF_6$ in PC as the electrolytic solution. The battery did not work at all.

EXAMPLE 6

The battery performance test was carried out in the same manner as described in Example 5 except that the battery was constructed by using the same positive and negative electrodes as used in Example 2 and 0.8 ml of a solution of 2.5 mole/l of $LiAsF_6$ in (PC+EC) (PC/EC volume ratio=1/2) as the electrolytic solution.

EXAMPLE 7

The battery performance test was carried out in the same manner as described in Example 5 except that the battery was constructed by using a composite of the acetylene high polymer with Al (weight ratio=1/1) as the negative electrode.

EXAMPLE 8

The battery performance test was carried out in the same manner as described in Example 1 except that 0.8 ml of a solution of 3.5 mole/l of $LiPF_6$ in a mixed solvent of (PC+EC) (volume ratio=1/1) was used as the electrolytic solution and the current density at charging and discharging was changed to 1.0 mA/cm$^2$. Note, the self-discharge ratio was measured after 100 hours' standing.

COMPARATIVE EXAMPLE 3

The battery performance test was carried out in the same manner as described in Example 8 except that the battery was constructed by using a solution of 3 mole/l of $LiPF_6$ in PC as the electrolytic solution.

COMPARATIVE EXAMPLE 4

The battery performance test was carried out in the same manner as described in Example 8 except that the battery was constructed by using a solution of 3 mole/l of $LiPF_6$ in EC as the electrolytic solution. This battery did not work at all.

EXAMPLE 9

The battery performance test was carried out in the same manner as described in Example 8 except that the battery was constructed by using the same positive and negative electrodes as used in Example 2 and 0.9 ml of a solution of 3.0 mole/l of $LiPF_6$ in a mixed solvent of (PC+EC) (PC/EC volume ratio=1/2) as the electrolytic solution.

EXAMPLE 10

The battery performance test was carried out in the same manner as described in Example 8 except that the battery was constructed by using a composite of the acetylene high polymer with Al (weight ratio=1/1) as the negative electrode.

EXAMPLE 11

The battery performance test was carried out in the same manner as described in Example 1 except that the battery was constructed by using the same positive electrode as used in Example 2 and 0.8 ml of a solution of 3.5 mole/l of $LiPF_6$ in a mixed solvent of (PC+EC+DME) (volume ratio=1/1/2) as the electrolytic solution. Note, charging was carried out at a current density of 0.5 mA/cm$^2$ while applying electricity in a quantity such that the doping quantities to the positive and negative electrodes were 50 mole% and 6 mole%, respectively, and discharging was carried out at a current density of 1.0 mA/cm$^2$. The self-discharge ratio was measured after 100 hours' standing.

COMPARATIVE EXAMPLE 5

The battery performance test was carried out in the same manner as described in Example 11 except that the battery was constructed by using a solution of 3 mole/l of $LiPF_6$ in PC as the electrolytic solution.

EXAMPLE 12

The battery performance test was carried out in the same manner as described in Example 11 except that the battery was constructed by using an Li/Al alloy (Li/Al weight ratio=94/6) as the negative electrode and 0.9 ml of 3.0 mole/l of $LiPF_6$ in a mixed solvent of (PC+EC+DME) (PC/EC/DME volume ratio=1/1/1) as the electrolytic solution.

EXAMPLE 13

The battery performance test was carried out in the same manner as described in Example 11 except that the battery was constructed by using a composite of the acetylene high polymer with Al (weight ratio=1/1) as the negative electrode.

EXAMPLE 14

The battery performance test was carried out in the same manner as described in Example 1 except that the battery was constructed by using 0.6 ml of a solution of 4 mole/l of $LiAsF_6$ in a mixed solvent of (PC+THF) (volume ratio=1/1) as the electrolytic solution and the current density at the time of charging and discharging was changed to 0.5 mA/cm$^2$.

COMPARATIVE EXAMPLE 6

The battery performance test was carried out in the same manner as described in Example 14 except that the battery was constructed by using a solution of 3.0 mole/l of $LiAsF_6$ in PC as the electrolytic solution.

EXAMPLE 15

The battery performance test was carried out in the same manner as described in Example 14 except that the battery was constructed by using the same positive and negative electrodes as used in Example 2, and 0.8 ml of a solution of 3.5 mole/l of $LiAsF_6$ in a mixed solvent of (EC+TFE) (EC/TFE volume ratio=2/3) as the electrolytic solution.

EXAMPLE 16

The battery performance test was carried out in the same manner as described in Example 15 except that the battery was constructed by using a composite of the acetylene high polymer with Al (weight ratio=1/1) as the negative electrode.

EXAMPLE 17

The battery performance test was carried out in the same manner as described in Example 1 except that the battery was constructed by using 0.7 cc of a solution of 4.0 mole/l of $LiBF_4$ in a mixed solvent of (PC+EC+DME) (volume ratio=1/1/2) as the electrolytic solution and the current density at the time of charging and discharging was changed to 1.0 mA/cm$^2$. Note, the self-discharge ratio was measured after 100 hours' standing.

COMPARATIVE EXAMPLE 7

The battery performance test was carried out in the same manner as described in Example 17 except that the battery was constructed by using a solution of 4.0 mole/l of $LiBF_4$ in PC as the electrolytic solution.

COMPARATIVE EXAMPLE 8

The battery performance test was carried out in the same manner as described in Example 17 except that the battery was constructed by using a solution of 3.0 mole/l of $LiBF_4$ in a mixed solvent of (PC+DME) (volume ratio=1/1) as the electrolytic solution.

EXAMPLE 18

The battery performance test was carried out in the same manner as described in Example 17 except that the battery was constructed by using the same positive and negative electrodes as used in Example 2 and 0.6 ml of a solution of 4.5 mole/l of $LiBF_4$ in a mixed solvent of (PC+EC+DME) (PC/EC/DME volume ratio=1/1/1) as the electrolytic solution.

EXAMPLE 19

The battery performance test was carried out in the same manner as described in Example 17 except that a composite of the acetylene high polymer with Al (weight ratio=1/1) was used as the negative electrode.

The results obtained in Examples 1 through 19 and Comparative Examples 1 through 8 are shown in Table 1.

TABLE 1

| Example No. | Positive electrode | Negative electrode | Supporting electrolyte | Solvent (vol. %) PC | EC | THF | DME | Concentration of supporting electrolyte in electrolyte solution Upon completion of charging (mol/l) | Upon completion of discharging (mol/l) | Current density (mA/cm²) At charging | At discharging | Repetition cycle life (times) | Energy density (W·hr/kg) | Maximum charging-discharging efficiency (%) | Self-discharge ratio (%) |
|---|---|---|---|---|---|---|---|---|---|---|---|---|---|---|---|
| Ex. 1 | Polyaniline | Polyacetylene | LiPF₆ | 50 | — | — | 50 | 0.7 | 4.0 | 2.5 | 2.5 | 648 | 110 | 100 | 1.9 |
| Ex. 2 | Reduced polyaniline | Li—Al alloy | LiPF₆ | 60 | — | — | 40 | 0.8 | 4.5 | 2.5 | 2.5 | 789 | 135 | 100 | 2.5 |
| Ex. 3 | Protonated polyaniline | Li—Al alloy | LiPF₆ | 60 | — | — | 40 | 0.8 | 4.5 | 2.5 | 2.5 | 737 | 130 | 100 | 4.3 |
| Ex. 4 | Polyaniline | Polyacetylene/Al composite | LiPF₆ | 50 | 50 | — | 50 | 0.7 | 4.0 | 2.5 | 2.5 | 737 | 113 | 100 | 4.6 |
| Ex. 5 | Polyaniline | Polyacetylene | LiAsF₆ | 50 | 50 | — | — | 0.6 | 3.0 | 1.0 | 1.0 | 652 | 110 | 100 | 1.0 |
| Comp. Ex. 1 | Polyaniline | Polyacetylene | LiAsF₆ | 100 | — | — | — | 0.6 | 3.0 | 1.0 | 1.0 | 85 | 110 | 80 | 7.8 |
| Ex. 6 | Reduced polyaniline | Li—Al alloy | LiAsF₆ | 33 | 67 | — | — | 0.5 | 2.5 | 1.0 | 1.0 | 791 | 140 | 100 | 0.8 |
| Ex. 7 | Polyaniline | Polyacetylene/Al composite | LiAsF₆ | 50 | 50 | — | — | 0.6 | 3.0 | 1.0 | 1.0 | 748 | 114 | 100 | 3.5 |
| Ex. 8 | Polyaniline | Polyacetylene | LiPF₆ | 50 | 50 | — | — | 0.8 | 3.5 | 1.0 | 1.0 | 657 | 120 | 100 | 1.2*¹ |
| Comp. Ex. 3 | Polyaniline | Polyacetylene | LiPF₆ | 100 | — | — | — | 0.8 | 3.0 | 1.0 | 1.0 | 90 | 110 | 80 | 9.1*¹ |
| Ex. 9 | Reduced polyaniline | Li—Al alloy | LiPF₆ | 33 | 67 | — | — | 0.7 | 3.0 | 1.0 | 1.0 | 797 | 143 | 100 | 0.9*¹ |
| Ex. 10 | Polyaniline | Polyacetylene/Al composite | LiPF₆ | 50 | 50 | — | — | 0.8 | 3.5 | 1.0 | 1.0 | 752 | 135 | 100 | 2.8*¹ |
| Ex. 11 | Reduced polyaniline | Polyacetylene | LiPF₆ | 25 | 25 | — | 50 | 0.6 | 3.5 | 0.5 | 0.5 | 630 | 120 | 100 | 1.4*¹ |
| Comp. Ex. 5 | Reduced polyaniline | Polyacetylene | LiPF₆ | 100 | — | — | — | 0.6 | 3.0 | 0.5 | 0.5 | 90 | 80 | 80 | 10.4*¹ |
| Ex. 12 | Reduced polyaniline | Li—Al alloy | LiPF₆ | 33 | 33 | — | 33 | 0.5 | 3.0 | 0.5 | 0.5 | 750 | 140 | 100 | 0.8*¹ |
| Ex. 13 | Reduced polyaniline | Polyacetylene/Al composite | LiPF₆ | 25 | 25 | — | 50 | 0.6 | 3.5 | 0.5 | 0.5 | 752 | 135 | 100 | 1.8*¹ |
| Ex. 14 | Polyaniline | Polyacetylene | LiAsF₆ | 50 | — | 50 | — | 0.7 | 4.0 | 0.5 | 0.5 | 657 | 115 | 100 | 0.9 |
| Comp. Ex. 6 | Polyaniline | Polyacetylene | LiAsF₆ | 100 | — | — | — | 0.6 | 3.0 | 0.5 | 0.5 | 92 | 110 | 85 | 7.3 |
| Ex. 15 | Reduced polyaniline | Li—Al alloy | LiAsF₆ | — | 40 | 60 | — | 0.6 | 3.5 | 0.5 | 0.5 | 794 | 140 | 100 | 0.8 |
| Ex. 16 | Reduced polyaniline | Polyacetylene/Al composite | LiAsF₆ | — | 40 | 60 | — | 0.6 | 3.5 | 0.5 | 0.5 | 748 | 120 | 100 | 1.2 |
| Ex. 17 | Polyaniline | Polyacetylene | LiBF₆ | 25 | 25 | — | 50 | 0.8 | 4.0 | 1.0 | 1.0 | 659 | 125 | 100 | 1.2*¹ |
| Comp. Ex. 7 | Polyaniline | Polyacetylene | LiBF₄ | 100 | — | — | — | 0.8 | 4.0 | 1.0 | 1.0 | 136 | 90 | 90 | 9.1*¹ |
| Comp. Ex. 8 | Polyaniline | Polyacetylene | LiBF₄ | 50 | 33 | — | 50 | 0.8 | 4.0 | 1.0 | 1.0 | 354 | 110 | 98 | 8.7*¹ |
| Ex. 18 | Reduced polyaniline | Li—Al alloy | LiBF₄ | 33 | 33 | — | 33 | 0.7 | 4.5 | 1.0 | 1.0 | 764 | 140 | 100 | 0.8*¹ |
| Ex. 19 | Polyaniline | Polyacetylene/Al composite | LiBF₄ | 25 | 25 | — | 50 | 0.8 | 4.0 | 1.0 | 1.0 | 755 | 135 | 100 | 2.4*¹ |

Note
*¹Determined after 100 hours' standing in examples marked with *¹, and after 75 hours' standing in the other examples

EXAMPLE 20

A glass vessel was charged with distilled water, from which oxygen had been removed in advance, HBF$_4$ and aniline so that the concentration of HBF$_4$ was 1.5 mole/l and the concentration of aniline was 0.35 mole/l. Two platinum electrodes having a surface area of 6 cm$^2$ were placed in the aqueous solution at an interval of 2 cm. Electrolysis was carried out at an electrical quantity of 120 ampere.second with stirring. A dense-green oxidation polymer was deposited on the positive electrode. The covered positive electrode was washed three times with distilled water and air-dried, and the formed film of the oxidation polymer of aniline was peeled from the platinum plate. The peeled oxidation polymer of aniline was immersed in 28% aqueous ammonia and allowed to stand overnight, and the aqueous ammonia was removed. The polymer was washed with an excessive amount of distilled water and vacuum-dried at 80° C. The obtained reddish brown film was immersed in a solution of 1 g of phenylhydrazine in 10 ml of diethyl ether in a nitrogen atmosphere and subjected to ultrasonic vibration for 1 hour. Then, the diethyl ether solution was removed and the film was washed with diethyl ether in a nitrogen atmosphere until the filtrate became colorless. The washed film was vacuum-dried at 80° C.

From the results of the elementary analysis of the obtained grey film, it was found that the total content of C, H and N was 99.88% by weight and the C/H/N ratio was 6.00/5.07/0.99. Accordingly, it was confirmed that the oxidation polymer of aniline represented substantially by the following formula (5) was in the completely reduced state:

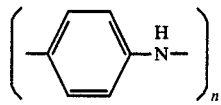
(5)

The battery was constructed in the same manner as described in Example 1 except that the so-obtained reduced polyaniline was used as the positive electrode and filmy Li metal was used as the negative electrode. The electrolytic solution used was the same as used in Example 1.

The so-constructed battery was charged at a constant current density of 1.5 mA/cm$^2$ until the battery voltage increased to 4.0 V, and after a rest time of 5 minutes, discharging was carried out at a constant current density of 2.0 mA/cm$^2$ until the battery voltage dropped to 2.0 V. After a rest of 5 minutes, charging was carried out under the same conditions as described above. When charging and discharging were thus repeated, the maximum discharge capacity was obtained at the 13th cycle, and at this cycle, the energy density was 287 W.hr/kg based on the unit weight of the active substance. The cycle life for reduction of the discharge capacity to a level of ½ of the maximum discharge capacity was 715. At the 50th cycle, the self-discharge ratio after one week was 6.3%.

EXAMPLES 21 THROUGH 23

The battery characteristics were determined in the same manner as described in Example 20 except the charge-stopping voltage and the discharge-stopping voltage were changed as shown in Table 2.

EXAMPLES 24 THROUGH 26

The battery performance test was carried out in the same manner as described in Example 20 except that the kind of the electrolytic solution was changed as shown in Table 2.

EXAMPLES 27 THROUGH 29

Polyaniline compounds were obtained by carrying out polymerization and reduction in the same manner as described in Example 20 except that various aniline compounds were used instead of aniline. The battery characteristics were determined in the same manner as described in Example 20 except that batteries were constructed by using these reduced polyaniline compounds.

EXAMPLES 30 THROUGH 32

The battery characteristics were determined in the same manner as described in Example 20 except that various Li alloys were used as the negative electrode instead of Li metal.

EXAMPLE 33

(Preparation of Oxidation Polymer of Aniline and Reduction Treatment)

A three-neck flask having a capacity of 1 liter was charged with 400 ml of distilled water, from which oxygen had been removed in advance, and 100 ml of a 42% aqueous solution of HBF$_4$, and nitrogen gas was bubbled in the solution with stirring for about 1 hour. Then, the inner atmosphere was replaced with nitrogen, a thermometer and a condenser were attached to the flask, and the solution temperature was adjusted to 40° C. Then, 20 g of aniline was added to the solution, and a solution of 46 g of ammonium persulfate in 200 ml of a 1N aqueous solution of HBF$_4$ was added dropwise to the aqueous solution of aniline over a period of about 2 hours. Reaction was carried out at 40° C. for 3 hours.

After termination of the reaction, the dense-green reaction liquid was filtered, and the recovered dense-green oxidation polymer of aniline was stirred in 500 ml of 28% aqueous ammonia for 1 hour. The liquid was filtered and the recovered solid was washed with 200 ml of distilled water 3 times repeatedly and vacuum-dried at 80° C. for 15 hours to obtain 18 g of a reddish violet powder. Then, 1,5 g of the reddish violet powder was added to 50 ml of a solution of 3 g of phenylhydrazine in diethyl ether and the mixture was stirred at room temperature for 1 hour. The liquid was filtered and the recovered solid was washed with diethyl ether until the filtrate became colorless. Then, the solid was vacuum-dried at 80° C. for 15 hours.

From the results of the elementary analysis, it was found that the total content of C, H and N was 99.18% by weight and the C/H/N ratio was 6.00/5.01/0.98.

(Battery Performance Test)

The battery performance test was carried out in the same manner as described in Example 20 except that the disk having a diameter of 20 mm, which was prepared from the polyaniline powder obtained according to the above-mentioned method (compression vacuum molding was carried out under 100 kg/cm$^2$ for 5 minutes and the polyaniline powder contained 10% of carbon black), was used as the positive electrode. It was found that the maximum energy density was 297 W.hr/kg, the cycle life was 712 and the self-discharge ratio was 5.6%

The results obtained in Examples 20 through 33 are shown in Table 2.

TABLE 2

| Example No. | Positive electrode | Negative electrode | Supporting electrolyte | Solvent (vol. %) PC | EC | THF | DME | Concentration of supporting electrolyte in electrolyte solution Upon completion of discharging (mol/l) | Upon completion of charging (mol/l) | Repetition cycle life (times) | Energy density (W · hr/kg) | Maximum charging-discharging efficiency (%) | Self-discharge ratio (%) |
|---|---|---|---|---|---|---|---|---|---|---|---|---|---|
| Ex. 20 | Reduced polyaniline | Li | LiPF$_6$ | 50 | — | — | 50 | 4.0 | 2.0 | 715 | 287 | 100 | 6.3 |
| Ex. 21 | Reduced polyaniline | Li | LiPF$_6$ | 50 | — | — | 50 | 4.2 | 2.0 | 656 | 312 | 100 | 6.2 |
| Ex. 22 | Reduced polyaniline | Li | LiPF$_6$ | 50 | — | — | 50 | 4.0 | 1.5 | 615 | 301 | 100 | 8.3 |
| Ex. 23 | Reduced polyaniline | Li | LiPF$_6$ | 50 | — | — | 50 | 4.5 | 2.0 | 660 | 320 | 100 | 7.5 |
| Ex. 24 | Reduced polyaniline | Li | LiBF$_4$ | 50 | — | — | 50 | 4.0 | 2.0 | 711 | 302 | 100 | 6.8 |
| Ex. 25 | Reduced polyaniline | Li | LiPF$_6$ | 33 | — | — | 67 | 4.0 | 2.0 | 709 | 279 | 100 | 7.2 |
| Ex. 26 | Reduced polyaniline | Li | LiAsF$_6$ | 67 | — | — | 33 | 4.0 | 2.0 | 710 | 280 | 100 | 8.0 |
| Ex. 27 | Reduced poly-2-methylaniline | Li | LiPF$_6$ | 50 | — | — | 50 | 4.0 | 2.0 | 539 | 289 | 100 | 10.3 |
| Ex. 28 | Reduced poly-2,6-dimethylaniline | Li | LiPF$_6$ | 50 | — | — | 50 | 4.0 | 2.0 | 622 | 270 | 100 | 9.7 |
| Ex. 29 | Reduced poly-2-methoxyaniline | Li | LiPF$_6$ | 50 | — | — | 50 | 4.0 | 2.0 | 558 | 296 | 100 | 12.7 |
| Ex. 30 | Reduced polyaniline | Li—Al (94/6 wt. %) alloy | LiPF$_6$ | 50 | — | — | 50 | 4.0 | 2.0 | 621 | 304 | 100 | 4.9 |
| Ex. 31 | Reduced polyaniline | Li—Al—Mg (7/80.5/2.5 wt. %) alloy | LiPF$_6$ | 50 | — | — | 50 | 4.0 | 2.0 | 659 | 300 | 100 | 7.8 |
| Ex. 32 | Reduced polyaniline | Li—Al (50/50 wt. %) alloy | LiPF$_6$ | 50 | — | — | 50 | 4.0 | 2.0 | 734 | 287 | 100 | 8.3 |
| Ex. 33 | Reduced polyaniline | Li | LiPF$_6$ | 50 | — | — | 50 | 4.0 | 2.0 | 712 | 297 | 100 | 5.6 |

We claim:

1. A nonaqueous secondary battery which comprises a positive electrode composed of a polymer obtained by oxidative polymerization of at least one aniline compound selected from the group consisting of compounds represented by the following formulae (1) and (2):

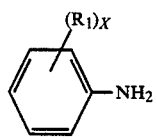

(1)

and

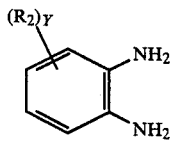

(2)

wherein R$_1$ and R$_2$ stand for an alkyl group having 1 to 5 carbon atoms or an alkoxy group having 1 to 5 carbon atoms, and X and Y are 0, 1 or 2, or a reduction product of said polymer, a negative electrode composed of (i) an alkali metal, (ii) an alkali metal alloy, (iii) an electroconductive polymer or (iv) a composite of an electroconductive polymer with an alkali metal or an alkali metal alloy, and an electrolytic solution comprising a supporting electrolyte selected from the group consisting of LiAsF$_6$, LiBF$_4$ and LiPF$_6$ and a solvent, wherein when the supporting electrolyte is LiAsF$_6$ or LiPF$_6$, the solvent is a mixed solvent comprising at least one member selected from the group consisting of propylene carbonate and ethylene carbonate and at least one member selected from the group consisting of tetrahydrofuran and 1,2-dimethoxyethane, and when the supporting electrolyte is LiBF$_4$, the solvent is a mixed solvent comprising propylene carbonate, ethylene carbonate and at least one member selected from the group consisting of tetrahydrofuran and 1,2-dimethoxyethane.

2. A nonaqueous secondary battery as set forth in claim 1, wherein the electrolytic solution comprises LiAsF$_6$ and a mixed solvent of propylene carbonate and tetrahydrofuran.

3. A nonaqueous secondary battery as set forth in claim 1, wherein the electrolytic solution comprises LiAsF$_6$ and a mixed solvent of ethylene carbonate and tetrahydrofuran.

4. A nonaqueous secondary battery as set forth in claim 1, wherein the electrolytic solution comprises LiAsF$_6$ and a mixed solvent of ethylene carbonate and propylene carbonate.

5. A nonaqueous secondary battery as set forth in claim 1, wherein the electrolytic solution comprises $LiPF_6$ and a mixed solvent of propylene carbonate, ethylene carbonate and 1,2-dimethoxyethane.

6. A nonaqueous secondary battery as set forth in claim 1, wherein the electrolytic solution comprises $LiPF_6$ and a mixed solvent of ethylene carbonate and propylene carbonate.

7. A nonaqueous secondary battery as set forth in claim 1, wherein the electrolytic solution comprises $LiPF_6$ and a mixed solvent of propylene carbonate and 1,2-dimethoxyethane.

8. A nonaqueous secondary battery as set forth in claim 1, wherein the electrolytic solution comprises $LiBF_4$ and a mixed solvent of propylene carbonate, ethylene carbonate and 1,2-dimethoxyethane.

9. A nonaqueous secondary battery as set forth in claim 1, wherein the content of each solvent component in the mixed solvent is at least 10% by volume based on the mixed solvent.

10. A nonaqueous secondary battery as set forth in claim 1, wherein the concentration of the lithium salt is at least 2 mole/l at the time of termination of discharging and not higher than 2 mole/l at the time of termination of charging.

11. A nonaqueous secondary battery as set forth in claim 10, wherein the lithium salt in $LiBF_4$.

12. A nonaqueous secondary battery as set forth in claim 10, wherein the lithium salt is $LiPF_6$.

13. A nonaqueous secondary battery as set forth in claim 1, wherein the voltage at termination of charging is not higher than 4.5 V and the voltage at termination of discharging is at least 1.5 V.

14. A nonaqueous secondary battery as set forth in claim 1, wherein the polymer used as the positive electrode is a polymer obtained by oxidative polymerization of aniline.

15. A nonaqueous secondary battery as set forth in claim 1, wherein the polymer obtained as the positive electrode is a reduction product of a polymer obtained by oxidative polymerization of aniline.

* * * * *